(12) United States Patent
Åberg

(10) Patent No.: US 12,115,883 B2
(45) Date of Patent: Oct. 15, 2024

(54) METHOD FOR BRAKING A VEHICLE

(71) Applicant: Volvo Car Corporation, Gothenburg (SE)

(72) Inventor: Emil Åberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 324 days.

(21) Appl. No.: 17/570,510

(22) Filed: Jan. 7, 2022

(65) Prior Publication Data

US 2022/0250482 A1     Aug. 11, 2022

(30) Foreign Application Priority Data

Feb. 10, 2021   (EP) ..................................... 21156421

(51) Int. Cl.
*B60L 7/26*     (2006.01)
*B60L 58/12*    (2019.01)

(52) U.S. Cl.
CPC ................. *B60L 7/26* (2013.01); *B60L 58/12* (2019.02); *B60L 2240/547* (2013.01)

(58) Field of Classification Search
CPC ...... B60L 7/26; B60L 58/12; B60L 2240/547; B60L 2240/549; B60W 30/18127
See application file for complete search history.

(56) References Cited

U.S. PATENT DOCUMENTS

2005/0264102 A1   12/2005  Tezuka
2009/0145673 A1   11/2009  Soliman et al.

FOREIGN PATENT DOCUMENTS

GB     2508668 A    6/2014
GB     2545261 A    6/2017

OTHER PUBLICATIONS

Jun. 25, 2021 European Search Report issued in International Application No. 21156421.

*Primary Examiner* — Huan Le
(74) *Attorney, Agent, or Firm* — Christopher L. Bernard; Clements Bernard Walker

(57) ABSTRACT

The present disclosure relates to a method for braking a vehicle, a vehicle including a control unit configured to perform such a method and a computer program element for braking a vehicle. The method for braking a vehicle includes estimating a potential brake energy to be regenerated during a braking event, determining a threshold based on a regenerating capacity of a first axle drive unit, comparing the potential brake energy to be regenerated with the threshold, and switching a second axle drive unit to a regeneration mode for regenerating the brake energy in case the potential brake energy to be regenerated is higher than the threshold.

14 Claims, 3 Drawing Sheets

METHOD FOR BRAKING A VEHICLE

CROSS-REFERENCE TO RELATED APPLICATION

The present disclosure claims the benefit of priority of co-pending European Patent Application No. 21 156 421.6, filed on Feb. 10, 2021, and entitled "Method for Braking a Vehicle," the contents of which are incorporated in full by reference herein.

TECHNICAL FIELD

The present disclosure relates to a method for braking a vehicle, a vehicle including a control unit configured to perform such a method and a computer program element for braking a vehicle.

BACKGROUND

In a motor vehicle, a brake system is activated to reduce a driving speed of the vehicle. Generally, the traditional brake system includes a brake disc on a wheel, which produces friction to slow or stop the vehicle. A friction energy generated during braking is converted into a heat energy, which may cause an overheating of the brake system. In contrast, battery electric vehicles or hybrid electric vehicles apply a regenerative brake system to reduce the thermal load on the brake disc and to use a battery system efficiently.

During regenerative braking, an electric motor acts as an electric generator and converts mechanical energy into electrical energy, which is fed into the battery system. However, enabling the regenerative braking or engaging components of the brake system in a regeneration mode may require an energy.

SUMMARY

There may be a need to provide an improved method for braking a vehicle, which allows a more efficient regeneration of a brake energy.

The problem is solved by the subject matter of the present disclosure, wherein further embodiments are incorporated. It should be noted that the aspects of the disclosure described in the following apply to the method for braking a vehicle, a vehicle including a control unit configured to perform such a method and a computer program element for braking a vehicle.

According to the present disclosure, a method for braking a vehicle is presented. The method includes estimating a potential brake energy to be regenerated during a braking event, determining a threshold based on a regenerating capacity of a first axle drive unit, comparing the potential brake energy to be regenerated with the threshold, and switching a second axle drive unit to a regeneration mode for regenerating the brake energy in case the potential brake energy to be regenerated is higher than the threshold.

The braking method according to the present disclosure may improve an energy efficiency of the vehicle by timely switching the axle drive units to the regeneration mode in accordance with the estimated potential brake energy. Accordingly, a driving potential of the vehicle and a sustainability of the vehicle may be increased.

The vehicle may include the first axle drive unit and the second axle drive unit, which are primarily configured to supply power to vehicle wheels. The power supply in each axle drive unit may be achieved by an electric machine coupled with a battery system and/or an internal combustion engine. In the regeneration mode of the brake energy, energy may flow in a reverse direction, i.e. from the wheels to the battery system via the electric machine, wherein the electric machine may act as a generator.

The first axle drive unit may be arranged in a rear side of the vehicle and the second axle drive unit may be arranged in a front side of the vehicle. Alternatively, the first axle drive unit may be arranged in the front side of the vehicle and the second axle drive unit may be arranged in the rear side of the vehicle. The battery system may be a single battery system for both axle drive units or it may include two separate battery units, each of which may be connected to each axle drive unit.

Generally, in battery electric vehicles or hybrid electric vehicles, at least one axle drive unit is continuously connected during a braking event for regenerating a brake energy. However, if the potential brake energy, which may be produced during the braking event, is higher than a threshold determined based on a regenerating capacity of the connected axle drive unit, an excess brake energy may be lost. In other words, if the connected axle drive unit is not able to absorb or regenerate the entire brake energy, the excess brake energy may be wasted in the environment. The term "regenerating capacity" may be understood as an ability of the axle drive unit for regenerating or recovering the brake energy during the braking event, particularly during a limited braking time. The regenerating capacity of the axle drive units may be defined by manufacturer specification.

In case the potential brake energy is higher than the threshold, the second axle drive unit, which is normally disconnected from the wheels during the braking event, may also be switched to the regeneration mode for regenerating the brake energy. In other words, the second axle drive unit may be connected to the wheels to deliver and recover the brake energy and supply electricity to the battery system.

Accordingly, a threshold may indicate, when is worthwhile to switch the second axle drive unit to the regeneration mode. A worthwhile moment to switch the second axle drive unit to the regeneration mode may be when the potential brake energy to be regenerated exceeds the threshold determined based on the regenerating capacity of the first axle drive unit.

In an embodiment, switching the second axle drive unit to a regeneration mode only in case the potential brake energy to be regenerated is higher than the threshold. Hence, the first axle drive unit may be connected to the wheels for regenerating the brake energy only if the estimated potential brake energy, which is able to be regenerated during the braking event, is higher than the threshold including the regenerating capacity of the first axle drive unit.

In an embodiment, determining a threshold based on a regenerating capacity of the first axle drive unit includes estimating a connecting energy required for switching the second axle drive unit to the regeneration mode. The threshold includes the regenerating capacity of the first axle drive unit and the connecting energy. The second axle drive unit may consume energy to be shifted in the regeneration mode during the braking event. This energy may be taken into account when estimating the threshold for verifying if it is worthwhile to connect the second axle drive unit for recovering the brake energy. In other words, the threshold may be determined by adding the connecting energy of the second axle drive unit and the regenerating capacity of the first axle drive unit. Hence, only if the potential brake energy is higher than a sum of the connecting energy of the second axle drive unit and the regenerating capacity of the first axle drive unit, the second axle drive unit may be switched in the generation mode.

In an embodiment, estimating a connecting energy includes estimating an energy consumption required to connect an electric motor unit arranged at the second axle drive unit to wheels arranged at the second axle drive unit. Generally, a driving energy may be supplied from the battery system to the electric motor unit to actuate the wheels connected to the axle drive unit. However, in the regeneration mode, the electric motor unit may generate an energy caused by a reverse torque applied to wheels to reduce a speed of the vehicle. The recovered energy may be then supplied to the battery system to store it.

Accordingly, to change an energy flow direction, at least the wheels, the second axle drive unit and the electric motor unit may be switched to the regeneration mode, which may require energy. For example, a clutch member arranged in the second axle drive unit may engage rotating shafts to transfer a kinetic energy to the electric motor unit, which may also require such a connecting energy. Hence, when estimating the connecting energy required for switching the second axle drive unit to the regeneration mode, the energy consumption for connecting the wheels, the second axle drive unit and the electric motor unit in a regeneration mode may be also taken into account.

In an embodiment, switching a second axle drive unit to a regeneration mode includes connecting the electric motor unit arranged at the second axle drive unit to the wheels arranged at the second axle drive unit during the braking event. If a control unit of the vehicle verifies that the potential brake energy to be regenerated is higher than the threshold, the wheels, the second axle drive unit and the electric motor unit may be switched to the regeneration mode for allowing a reverse energy flow.

In an embodiment, switching a second axle drive unit to a regeneration mode includes connecting a first electric motor and a second electric motor of the electric motor unit arranged at the second axle drive unit to each of the wheels arranged at the second axle drive unit. The electric motor unit arranged at the second axle drive unit may include the first electric motor and the second electric motor, each of which is assigned to each wheel arranged at the second axle drive unit. In other words, wheels arranged at the second axle drive unit may include an individual electric motor. The battery system may be connected to each of the electric motors to supply power or to recover the brake energy.

During the braking event, if the potential brake energy is higher than the threshold, the second axle drive unit may be switched to the regeneration mode and the first electric motor and/or the second electric motor may start to regenerate the brake energy and supply regenerated electricity to the battery system. Accordingly, an energy efficiency of the vehicle may be improved.

In an embodiment, the method further includes monitoring an environment of the vehicle affecting the brake event. The potential brake energy, which may be regenerated during the braking event, may be influenced by several parameters such as a braking distance, a speed of the vehicle, a mass of the vehicle etc. To estimate a reliable potential brake energy, the environment of the vehicle may be monitored in real-time.

In an embodiment, monitoring an environment includes estimating a distance between the vehicle and a reference object, a speed of the vehicle, a relative speed of the vehicle relative to the reference object and/or a mass of the vehicle.

The parameters, which may influence a brake energy mainly, are the speed of the vehicle and the mass of the vehicle, by which the kinetic energy may be determined. Additionally, to determine the potential brake energy, which may be regenerated during the braking event, the distance between the vehicle and the reference object, the relative speed of the vehicle relative to the reference object, a driving path and/or weather may be considered.

In an embodiment, the reference object is a preceding vehicle in a driving direction. In other words, the reference object is a vehicle driving ahead relative to the vehicle to be braked. Additionally or alternatively, the reference object may also be any obstruction on the road or a light signal. The potential brake energy may thus depend on the relative speed of the vehicle to be braked relative to the preceding vehicle and the distance between the vehicle to be braked and the preceding vehicle.

For example, if the vehicle to be braked approaches to the preceding vehicle or the reference object at a low over speed and at an essentially long or adequate braking distance, the first axle drive unit may not require an additional axle drive unit to regenerate the brake energy. In other words, if the vehicle to be braked drives essentially slightly faster than the preceding vehicle at the essentially long braking distance, the potential brake energy may be lower than the threshold and the second axle drive unit may not be switched to the regeneration mode.

However, if the vehicle to be braked approaches to the preceding vehicle or the reference object at a high over speed and at an essentially long or adequate braking distance, the first axle drive unit may require an additional axle drive unit to regenerate the entire brake energy. In other words, if the vehicle to be braked drives essentially much faster than the preceding vehicle at the adequate braking distance, the potential brake energy may be higher than the threshold. Hence, the second axle drive unit may be switched to the regeneration mode and the wheels arranged at the second axle drive unit may be connected to the electric motor unit to recover the brake energy.

Also in case the vehicle to be braked approaches to the preceding vehicle or the reference object at a low over speed but at a short braking distance, the first axle drive unit may require an additional axle drive unit to regenerate the entire brake energy. In other words, if the vehicle to be braked drives essentially slightly faster than the preceding vehicle but at the short braking distance, the potential brake energy may be higher than the threshold. Hence, the second axle drive unit may be switched to the regeneration mode and the wheels arranged at the second axle drive unit may be connected to the electric motor unit to recover the brake energy.

In an embodiment monitoring is performed by a Lidar system or a radar system. The Lidar (light detection and ranging) system includes at least one light source and a receiver to measure a distance to a remote target. The light source emits light towards a target, which then scatters the light. Some of the scattered light is received back at the receiver. The system determines the distance to the target based on one or more characteristics associated with the returned light. Whereas the radar system determines a distance to the remote target by measuring a reflection of a high-frequency signal from the target. Additionally or alternatively, an ultrasonic sensor may be also used to measure the distance to the remote target. By applying such distance measuring systems, a precise distance measurement between the vehicle to be braked and the reference object may be achieved and an accurate estimating of the potential brake energy may be performed.

In an embodiment, the method further includes actuating a mechanical brake element during the braking event in case the potential brake energy to be regenerated is higher than a sum of the regenerating capacities of the first axle drive unit and the second axle drive unit. In other words, even if both of the first axle drive unit and the second axle drive unit may operate in the regeneration mode, the potential brake energy may be even higher than the sum of the regenerating capacities of them. In such a case, the mechanical brake element such as brake disk may be connected to wheels to mechanically brake the vehicle. This may occur for example, during an urgent braking event.

In an embodiment, the first axle drive unit is an electric rear axle drive (ERAD) unit and the second axle drive unit is an electric front axle drive (EFAD) unit. The electric axle drive units may include an electric motor unit, power electronics and a transmission unit to directly power each axle. Generally, the vehicle includes one electric axle drive unit in the front side and one electric axle drive unit in the rear sides of the vehicle, wherein the wheels arranged at the electric rear axle drive (ERAD) unit may be continuously connected during the braking event. In contrast, the wheels arranged at the electric front axle drive (EFAD) unit may be connected during the braking event, in case the potential brake energy to be regenerated is higher than the threshold including a regenerating capacity of the electric rear axle drive (ERAD) unit and a connecting energy of the electric front axle drive (EFAD) unit with wheels.

According to the present disclosure, a vehicle is presented. The vehicle includes a control unit, which is configured to perform:
  estimating a potential brake energy to be regenerated during a braking event,
  determining a threshold based on a regenerating capacity of a first axle drive unit,
  comparing the potential brake energy to be regenerated with the threshold, and
  in case the potential brake energy to be regenerated being higher than the threshold, switching a second axle drive unit to a regeneration mode for regenerating the brake energy.

Accordingly, an energy efficiency of the vehicle may be improved by timely switching the axle drive units to the regeneration mode in accordance with the estimated potential brake energy. In particular, the control unit may determine when is worthwhile to switch the second axle drive unit to the regeneration mode. Hence, a driving potential of the vehicle and a sustainability of the vehicle may be increased.

In an embodiment, the vehicle is a battery electric vehicle (BEV) or a hybrid electric vehicle (HEV). The control unit may be an engine control unit (ECU) or a separate control unit. The vehicle may further include an electric rear axle drive (ERAD) unit and an electric front axle drive (EFAD) unit. Each electric axle drive unit may include an electric motor unit, power electronics and a transmission unit to directly power each axle. Generally, the wheels arranged at the electric rear axle drive (ERAD) unit may be continuously connected during the braking event. In contrast, the wheels arranged at the electric front axle drive (EFAD) unit may be connected during the braking event, in case the potential brake energy to be regenerated is higher than the threshold including regenerating capacity of the electric rear axle drive (ERAD) unit and a connecting energy of the electric front axle drive (EFAD) unit with wheels. Alternatively, the wheels arranged at the electric front axle drive (EFAD) unit may be continuously connected during the braking event, whereas the wheels arranged at the electric rear axle drive (ERAD) unit may be connected during the braking event, in case the potential brake energy to be regenerated is higher than the threshold including a regenerating capacity of the electric front axle drive (EFAD) unit and a connecting energy of the electric rear axle drive (ERAD) unit with wheels.

According to the present disclosure, also a computer program element is presented. The computer program is configured for braking a vehicle as described above, which, when being executed by a processing element, is adapted to perform the method as described above.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF THE DRAWINGS

Exemplary embodiments of the disclosure will be described in the following with reference to the following drawings.

DESCRIPTION OF EMBODIMENTS

Figure 1:
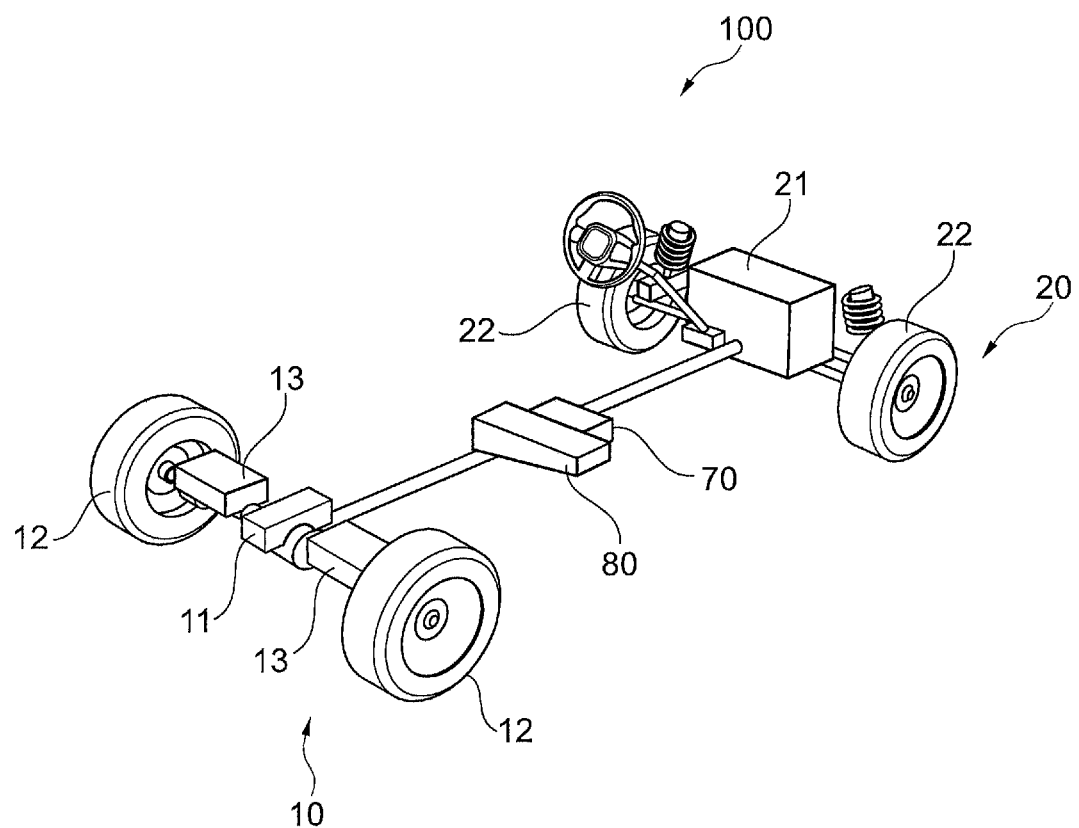
FIG. 1 shows schematically and exemplarily an embodiment of a vehicle according to the present disclosure.
Figure 3:
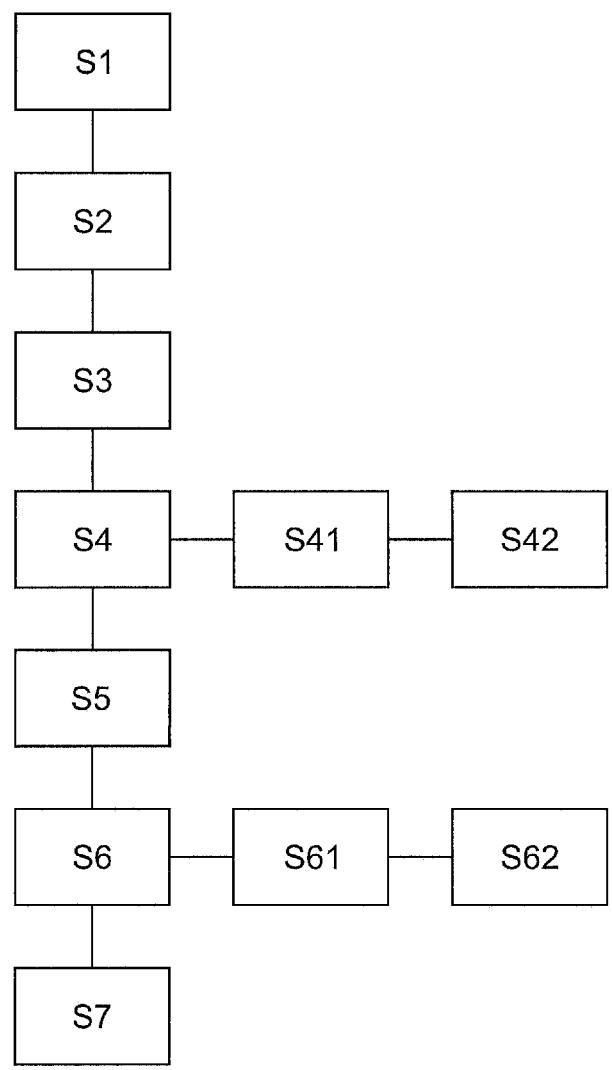
FIG. 3 shows schematically and exemplarily an embodiment of a method for braking a vehicle according to the present disclosure.

FIG. 1 shows a vehicle 100 to be braked. The vehicle 100 may be a battery electric vehicle (BEV) or a hybrid electric vehicle (HEV) including a control unit 70 configured to perform a method for braking as shown in FIG. 3.

The vehicle 100 further includes a first or electric rear axle drive (ERAD) unit 10 and a second or electric front axle drive (EFAD) unit 20. Each of the electric rear axle drive (ERAD) unit 10 and the electric front axle drive (EFAD) unit 20 includes an electric motor unit 11, 21, power electronics (not shown) and a transmission unit (not shown) to allow wheels 12, 22 arranged at each axle drive unit to rotate, wherein the electric motor units 11, 21 may include two electric motor for each wheels arranged at the respective axle drive unit 10, 20. A battery system 80 is connected to each electric motor unit 11, 21 of the axle drive units 10, 20 to supply power. In addition to the battery system 80 the electric rear axle drive (ERAD) unit 10 or the electric front axle drive (EFAD) unit 20 may be also connected to an internal combustion engine (not shown).

In general, the wheels 12 arranged at the electric rear axle drive (ERAD) unit 10 are continuously connected during a braking event for recovering a brake energy. In contrast, the wheels 22 arranged at the electric front axle drive (EFAD) unit 20 is connected during the braking event, in case a potential brake energy E to be regenerated is higher than a threshold 40. In other words, if the potential brake energy E to be regenerated is lower than a threshold 40, the brake energy may be recovered only by the electric rear axle drive (ERAD) unit 10.

The control unit 70 of the vehicle 100 is, hence, configured to determine the threshold 40 indicating, when is worthwhile to connect the wheels 22 to the electric front axle drive (EFAD) unit 20. The threshold 40 is determined by summing up a regenerating capacity 31 of the electric rear axle drive (ERAD) unit 10 and a connecting energy 33 required to connecting the wheels 22 to the electric motor unit 21 or shifting the electric front axle drive (EFAD) unit 20 to a regeneration mode.

The potential brake energy E may be estimated by monitoring an environment of the vehicle 100 affecting the brake event such as a distance between the vehicle 100 and a reference object 200, a speed of the vehicle 100, a relative speed of the vehicle 100 relative to the reference object 200 and/or a mass of the vehicle 100. Monitoring the environment may be performed by a Lidar or radar system or the like.

Figure 2:
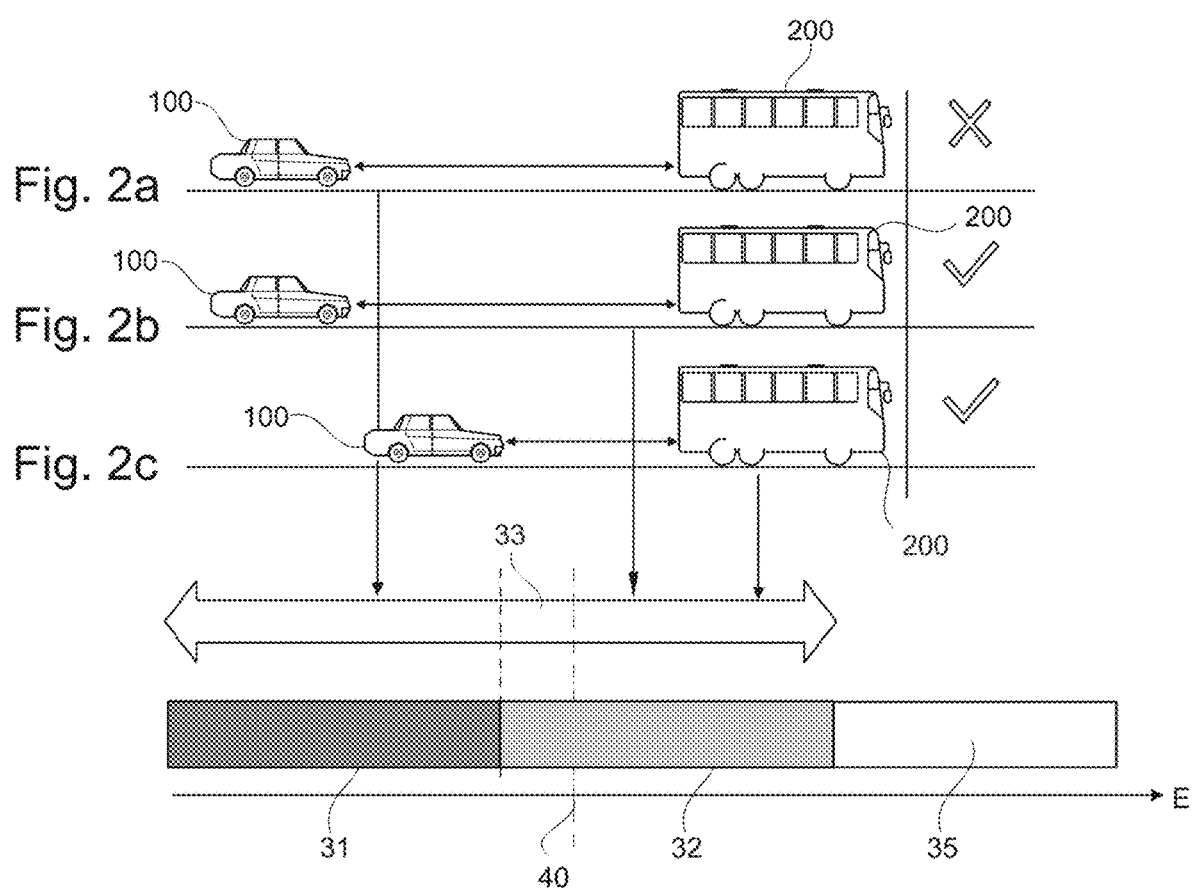
FIG. 2a, 2b, 2c show schematically and exemplarily an embodiment of a method for braking a vehicle according to the present disclosure.

As shown in FIG. 2a, the reference object 200 may be a preceding vehicle 200 in a driving direction relative to the vehicle 100 to be braked. If the vehicle 100 to be braked approaches to the preceding vehicle 200 at a low over speed and at an essentially long or adequate braking distance, the electric rear axle drive (ERAD) unit 10 may be able to regenerate the entire brake energy. In other words, the potential brake energy E is lower than the threshold 40 such that the electric rear axle drive (ERAD) unit 10 does not require any additional axle drive unit to regenerate the brake energy.

However, if the vehicle 100 to be braked approaches to the preceding vehicle 200 or the reference object 200 at a high over speed at an adequate braking distance (see FIG. 2b), the electric rear axle drive (ERAD) unit 10 requires an additional axle drive unit, i.e. the electric front axle drive (EFAD) unit 20, to regenerate the entire brake energy. In other words, the estimated potential brake energy E is higher than the threshold 40. Hence, the electric front axle drive (EFAD) unit 20 is switched to the regeneration mode and the wheels arranged at the electric front axle drive (EFAD) unit 20 are connected to the electric motor unit 21 to recover the brake energy.

FIG. 2c shows, if the vehicle 100 to be braked approaches to the preceding vehicle 200 at a low over speed but at a short braking distance, the potential brake energy E may be also higher than the threshold 40 such that the electric front axle drive (EFAD) unit 20 is switched to the regeneration mode to recover the brake energy.

However, in case the potential brake energy E to be regenerated is even higher than a sum of the regenerating capacities 31, 32 of the electric rear axle drive (ERAD) unit 10 and the electric front axle drive (EFAD) unit 20, a mechanical brake element 13 of the vehicle 100 may be actuated to perform an urgent braking and a braking capacity 35 of the conventional mechanical brake element 13 may be applied.

FIG. 3 shows the method for braking a vehicle 100. The method includes, but not necessarily in this order:
- monitoring S1 an environment of the vehicle 100 affecting the brake event,
- monitoring S2 an environment including estimating a distance between the vehicle 100 and a reference object 200, a speed of the vehicle 100, a relative speed of the vehicle 100 relative to the reference object 200 and/or a mass of the vehicle 100,
- estimating S3 a potential brake energy E to be regenerated during a braking event,
- determining S4 a threshold 40 based on a regenerating capacity 31 of a first axle drive unit 10,
- comparing S5 the potential brake energy E to be regenerated with the threshold 40, and
- switching S6 a second axle drive unit 20 to a regeneration mode for regenerating the brake energy, in case the potential brake energy E to be regenerated being higher than the threshold 40.

The method further includes, but not necessarily in this order:
- estimating S41 a connecting energy 33 required for switching the second axle drive unit 20 to the regeneration mode, the threshold 40 including the regenerating capacity 31 of the first axle drive unit 10 and the connecting energy 33,
- estimating S42 an energy consumption required to connect an electric motor unit 21 arranged at the second axle drive unit 20 to wheels 22 arranged at the second axle drive unit 20,
- connecting S61 the electric motor unit 21 arranged at the second axle drive unit 20 to the wheels 22 arranged at the second axle drive unit 20 during the braking event,
- connecting S62 a first electric motor and a second electric motor of the electric motor unit 21 arranged at the second axle drive unit 20 to each of the wheels 22 arranged at the second axle drive unit 20, and
- actuating S7 a mechanical brake element 13 during the braking event in case the potential brake energy E to be regenerated being higher than a sum of the regenerating capacities 31, 32 of the first axle drive unit 10 and the second axle drive unit 20.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for braking a vehicle, comprising:
   estimating a potential brake energy (E) to be regenerated during a braking event,
   determining a threshold based on a regenerating capacity of a first axle drive unit,
   comparing the potential brake energy (E) to be regenerated with the threshold, and
   in case the potential brake energy (E) to be regenerated being higher than the threshold, switching a second axle drive unit to a regeneration mode for regenerating brake energy,
   wherein determining the threshold based on the regenerating capacity of the first axle drive unit comprises estimating a connecting energy required for switching the second axle drive unit to the regeneration mode, the threshold comprising the regenerating capacity of the first axle drive unit and the connecting energy.

2. The method according to claim 1, further comprising switching the second axle drive unit to the regeneration mode only in case the potential brake energy (E) to be regenerated is higher than the threshold.

3. The method according to claim 1, wherein the estimating the connecting energy comprises estimating an energy consumption required to connect an electric motor unit arranged at the second axle drive unit to wheels arranged at the second axle drive unit.

4. The method according to claim 3, wherein the switching the second axle drive unit to the regeneration mode comprises connecting the electric motor unit arranged at the second axle drive unit to the wheels arranged at the second axle drive unit during the braking event.

5. The method according to claim 4, wherein the switching the second axle drive unit to the regeneration mode comprises connecting a first electric motor and a second electric motor of the electric motor unit arranged at the second axle drive unit to each of the wheels arranged at the second axle drive unit.

6. The method according to claim 1, further comprising monitoring an environment of the vehicle affecting the brake event.

7. The method according to claim 6, wherein the monitoring the environment comprises estimating at least one of a distance between the vehicle and a reference object, a speed of the vehicle, a relative speed of the vehicle relative to the reference object and a mass of the vehicle.

8. The method according to claim 6, wherein the monitoring the environment is performed by a Lidar system or a radar system.

9. The method according to claim 7, wherein the reference object is a preceding vehicle in a driving direction.

10. The method according to claim 1, further comprising actuating a mechanical brake element during the braking event in case the potential brake energy (E) to be regenerated being higher than a sum of the regenerating capacities of the first axle drive unit and the second axle drive unit.

11. The method according to claim 1, wherein the first axle drive unit is an electric rear axle drive (ERAD) unit and the second axle drive unit is an electric front axle drive (EFAD) unit.

12. A non-transitory computer program element comprising instructions stored in a memory for braking the vehicle, which, when executed by a processing element, is adapted to perform the method steps of claim 1.

13. A vehicle comprising a control unit, the control unit being configured to perform:
   estimating a potential brake energy (E) to be regenerated during a braking event,
   determining a threshold based on a regenerating capacity of a first axle drive unit,
   comparing the potential brake energy (E) to be regenerated with the threshold, and
   in case the potential brake energy (E) to be regenerated being higher than the threshold, switching a second axle drive unit to a regeneration mode for regenerating brake energy,
   wherein determining the threshold based on the regenerating capacity of the first axle drive unit comprises estimating a connecting energy required for switching the second axle drive unit to the regeneration mode, the threshold comprising the regenerating capacity of the first axle drive unit and the connecting energy.

14. The vehicle according to claim 13, wherein the vehicle is a battery electric vehicle or a hybrid electric vehicle.

* * * * *